(12) United States Patent
Wang et al.

(10) Patent No.: US 11,012,592 B2
(45) Date of Patent: May 18, 2021

(54) IMAGE ANALYZING METHOD AND RELATED IMAGE ANALYZING DEVICE

(71) Applicant: VIVOTEK INC., New Taipei (TW)

(72) Inventors: Hsiang-Sheng Wang, New Taipei (TW); Shih-Hsuan Chen, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 16/671,190

(22) Filed: Nov. 1, 2019

(65) Prior Publication Data

US 2020/0213481 A1    Jul. 2, 2020

(30) Foreign Application Priority Data

Dec. 26, 2018   (TW) .................................. 107147054

(51) Int. Cl.
*G06T 7/20*       (2017.01)
*H04N 5/14*       (2006.01)
*G06K 9/00*       (2006.01)

(52) U.S. Cl.
CPC ......... *H04N 5/142* (2013.01); *G06K 9/00335* (2013.01); *G06K 9/00369* (2013.01); *G06T 7/20* (2013.01)

(58) Field of Classification Search
CPC ............. G06K 9/48; H04N 5/142; G06T 7/20

USPC .......................................... 382/190; 348/625
See application file for complete search history.

(56) References Cited

U.S. PATENT DOCUMENTS

| | | |
|---|---|---|
| 7,119,816 B2 | 10/2006 | Zhang |
| 7,899,208 B2 | 3/2011 | Kondo |
| 2018/0357504 A1* | 12/2018 | Zamir ................. G06K 9/4609 |

FOREIGN PATENT DOCUMENTS

| | | |
|---|---|---|
| TW | 201328312 A1 | 7/2013 |
| TW | 201834445 A | 9/2018 |

* cited by examiner

*Primary Examiner* — John W Miller
*Assistant Examiner* — Sihar A Karwan
(74) *Attorney, Agent, or Firm* — Winston Hsu

(57) ABSTRACT

An image analyzing method of detecting a dimension of a region of interest inside an image is applied to an image analyzing device. The image analyzing method includes positioning an initial triggering pixel unit within a detective identifying area inside the image, and assigning a first detection region via a center of the initial triggering pixel unit, positioning a first based pixel unit conforming to a first target value inside the first detection region, applying a mask via a center of the first based pixel unit to determine whether a first triggering pixel unit exists inside the mask, and utilizing a determination result of the initial triggering pixel unit and the first triggering pixel unit to decide a maximal dimension of the region of interest.

22 Claims, 9 Drawing Sheets

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 1 | 0 | 0 | 0 | 1 | 0 | 0 | 0 |
| 0 | 0 | 0 | 1 | 1 | 0 | 0 | 0 | 0 | 0 |
| 0 | 0 | 0 | 1 | 0 | 0 | 0 | 0 | 0 | 0 |
| 0 | 0 | 0 | 0 | 1 | 1 | 0 | 0 | 0 | 0 |
| 0 | 0 | 0 | 1 | 0 | 0 | 0 | 0 | 0 | 0 |
| 0 | 0 | 0 | 0 | 0 | 0 | 0 | 0 | 0 | 0 |

Ci points to the dashed region; Ri on the right.

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 1 | 0 | 0 | 0 | 1 | 0 | 0 | 0 |
| 0 | 0 | 0 | 1 | 1 | 0 | 0 | 0 | 0 | 0 |
| 0 | 0 | 0 | 1 | 0 | 0 | 0 | 0 | 0 | 0 |
| 0 | 0 | 0 | 0 | 1 | 1 | 0 | 0 | 0 | 0 |
| 0 | 0 | 0 | 1 | 0 | 0 | 0 | 0 | 0 | 0 |
| 0 | 0 | 0 | 0 | 0 | 0 | 0 | 0 | 0 | 0 |

IMAGE ANALYZING METHOD AND RELATED IMAGE ANALYZING DEVICE

BACKGROUND OF THE INVENTION

1. Field of the Invention

The present invention relates to an image analyzing method and an image analyzing device, and more particularly, to an image analyzing method of detecting a dimension of a region of interest inside an image and a related image analyzing device.

2. Description of the Prior Art

A conventional image analyzing method sets a detective identifying area inside a monitoring image to detect an amount of triggering pixel units within the detective identifying area, and determines whether to trigger an event or actuate a specific function or application program. If a small part of the region of interest is overlapped with the detective identifying area, the amount of the triggering pixel units occupied by the region of interest is a small number, and the conventional image analyzing method cannot identify the region of interest and may result in misjudgment. If a lot of false-triggering regions or small-scale regions of non-interest are inside the detective identifying area, the amount of the triggering pixel unit capable of being detected is a large number, so the conventional image analyzing method triggers the event and results in the misjudgment. Therefore, design of an image analyzing method of sieving the false-triggering region and accurately detecting a maximal dimension of the region of interest outside the detective identifying area to avoid the misjudgment is an important issue in the related monitoring apparatus industry.

SUMMARY OF THE INVENTION

The present invention provides an image analyzing method of detecting a dimension of a region of interest inside an image and a related image analyzing device for solving above drawbacks.

According to the claimed invention, an image analyzing method of detecting a dimension of a region of interest inside an image is disclosed. The image analyzing method includes positioning an initial triggering pixel unit within a detective identifying area inside the image, assigning a first detection region with a center based on the initial triggering pixel unit, positioning a first based pixel unit conforming to a first target value inside the first detection region, applying a mask with a center based on the first based pixel unit to determine whether a first triggering pixel unit is positioned inside the mask, and utilizing a positioning result of the initial triggering pixel unit and the first triggering pixel unit to decide a maximal dimension of the region of interest inside the image.

According to the claimed invention, an image analyzing device of detecting a dimension of a region of interest inside an image and further applying for a monitoring camera apparatus is disclosed. The image analyzing device includes an image generator adapted to receive the image, and an operation processor electrically connected to the image generator. The operation processor is adapted to position an initial triggering pixel unit within a detective identifying area inside the image, assign a first detection region with a center based on the initial triggering pixel unit, position a first based pixel unit conforming to a first target value inside the first detection region, apply a mask with a center based on the first based pixel unit to determine whether a first triggering pixel unit is positioned inside the mask, and utilize a positioning result of the initial triggering pixel unit and the first triggering pixel unit to decide a maximal dimension of the region of interest inside the image.

The image analyzing method and the related image analyzing device of the present invention can accurately position the maximal dimension of the region of interest inside the detective identifying area, for advancing accuracy of the image identification. If the total number of the triggering pixel occupied by the moving region of interest inside the monitoring image conforms to the triggering condition, the image analyzing method of the present invention can analyze and acquire the maximal dimension of the region of interest, so as to further identify that the moving region of interest belongs to the single region of interest with the large scale, or the distributed regions of interest with the small scale, or the false-triggering region. If a part of the region of interest is inside the detective identifying area, such as a lower part of a passerby being inside the detective identifying area upon the pedestrian crosswalk, the image analyzing method of the present invention still can utilize the triggering pixel unit within the detective identifying area to position the maximal dimension of the region of interest probably outside the detective identifying area, and accurately determine whether to trigger the event or apply to the similar matrix computation. In addition, the image analyzing method of the present invention can adjust the target value and the marking value of the triggering pixel unit in every positioning phases, and thus the triggering pixel unit positioned in the previous phase cannot be re-positioned in the following phase, so as to effectively decrease computation data for improving computation efficiency of the image analyzing device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 to FIG. 10 are diagrams of the monitoring image in different phases according to the embodiment of the present invention.

DETAILED DESCRIPTION

Figure 1:
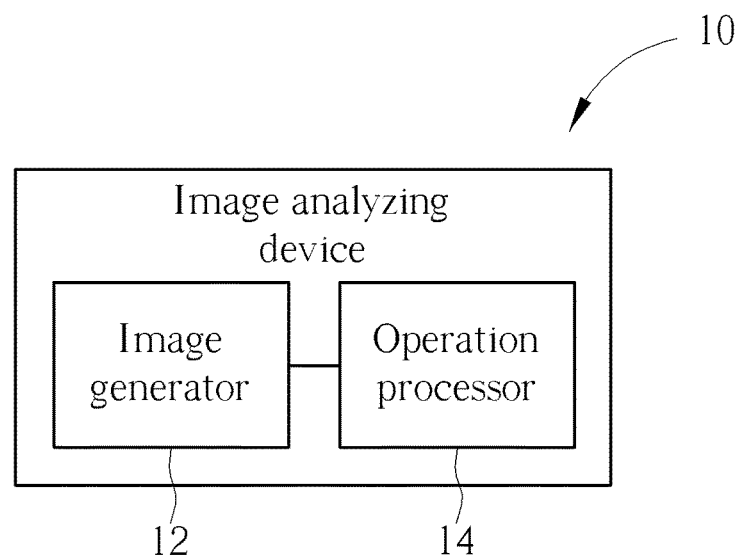
FIG. 1 is a functional block diagram of an image analyzing device according to an embodiment of the present invention.
Figure 2:
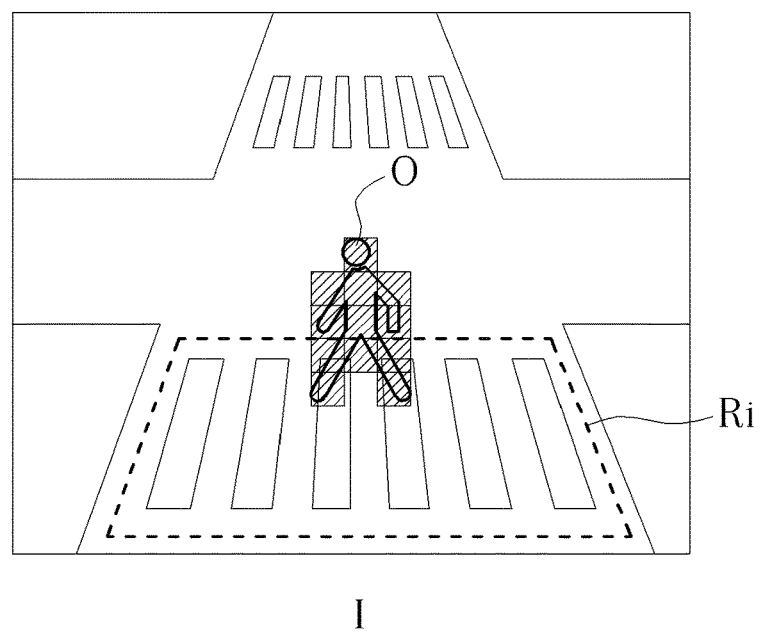
FIG. 2 is a diagram of a monitoring image acquired by the image analyzing device according to the embodiment of the present invention.
Figure 3A:
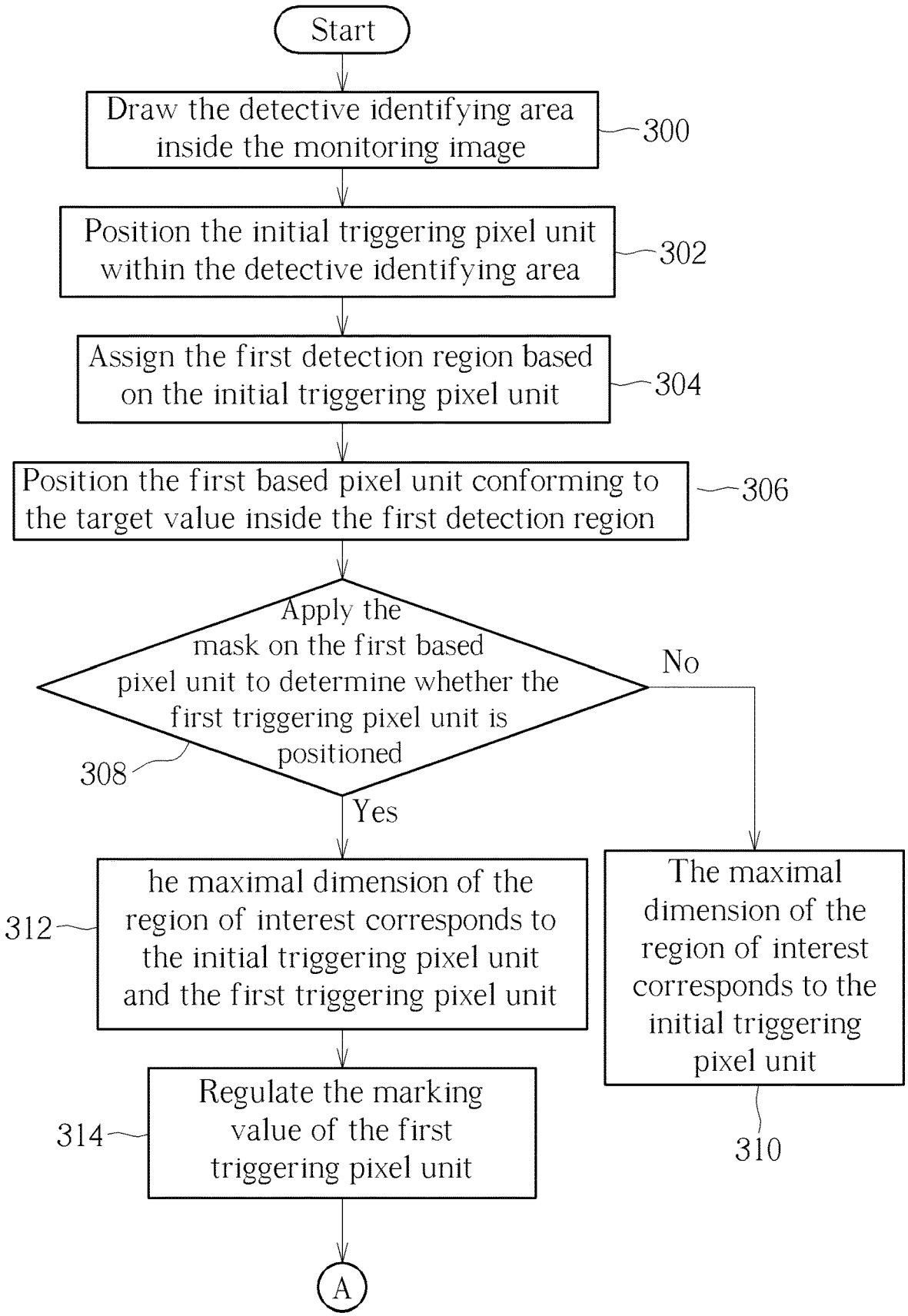
FIG. 3A and FIG. 3B are flow charts of an image analyzing method according to the embodiment of the present invention.
Figure 3B:
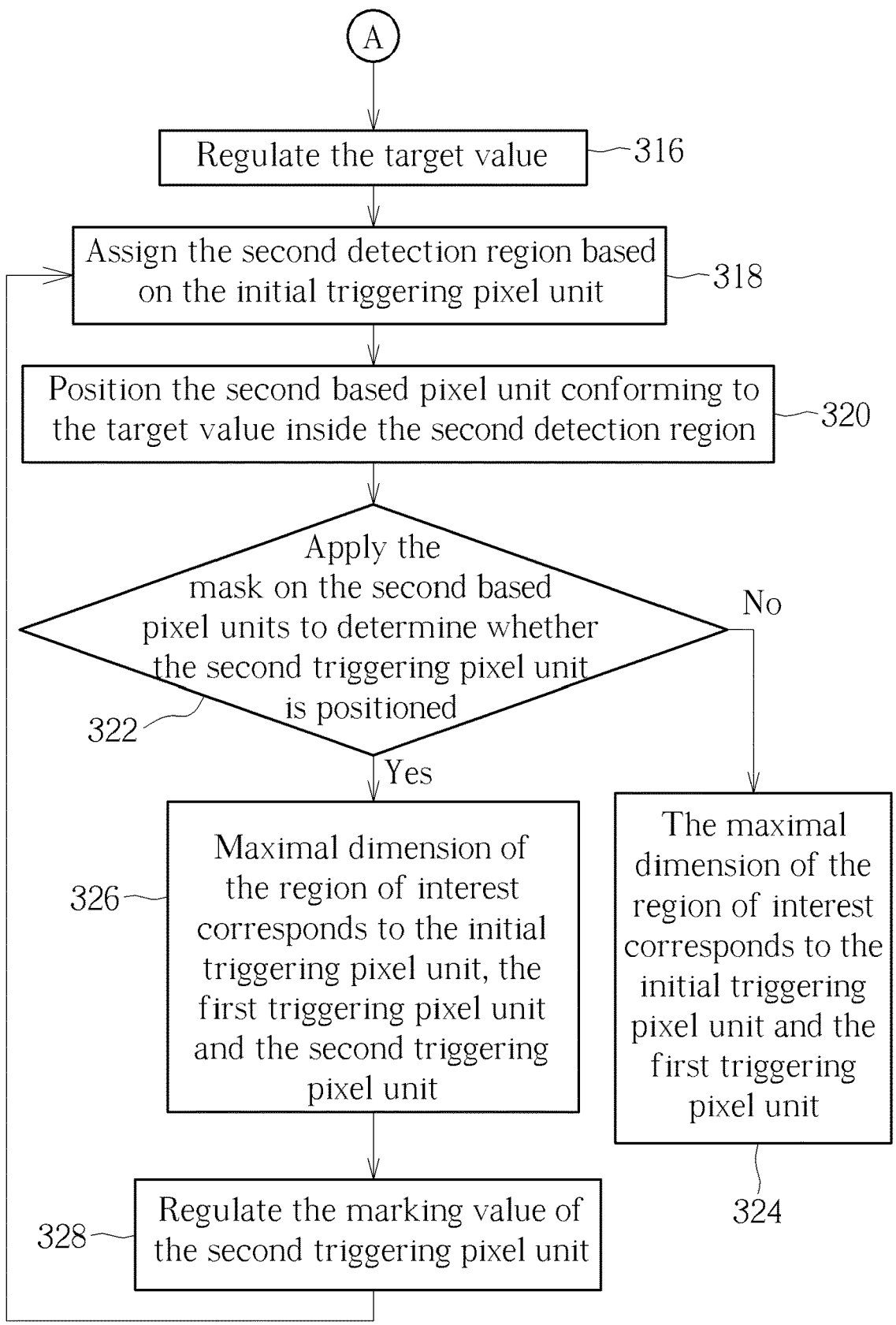

Please refer to FIG. 1 and FIG. 2. FIG. 1 is a functional block diagram of an image analyzing device 10 according to an embodiment of the present invention. FIG. 2 is a diagram of a monitoring image I acquired by the image analyzing device 10 according to the embodiment of the present invention. The image analyzing device 10 can be applied for a monitoring camera apparatus, and used to analyze a dimension of a region of interest O inside the monitoring image I, so as to determine whether to trigger an event for actuating a specific function or an application program. For example, when the monitoring image I is generated by the monitoring camera apparatus, the image analyzing device 10 can analyze the dimension of the specific region of interest O inside the monitoring image I. If the dimension of the region of interest O conforms to a predefined standard, the region of interest O may be close to the monitoring camera apparatus within the monitoring area, and the region of interest O can be applied for an image identifying function or other extra applications. If the dimension of the region of interest O does not conform to the predefined standard, the region of interest O may be far from the monitoring camera apparatus, so that the image identifying function or other extra applications are not actuated. The extra application may be detection or analysis of intensity or any specific parameter of the region of interest O.

The image analyzing device 10 can include an image generator 12 and an operation processor 14 electrically connected to each other. The image generator 12 can acquire the monitoring image I. The operation processor 14 can analyze the monitoring image I to execute the image analyzing method for acquiring a maximal dimension of the region of interest O, and then determine whether to actuate the event or similar matrix computation. The image generator 12 can be a camera used to capture the monitoring image I. The image generator 12 further can be a receiver; a camera of the monitoring camera apparatus captures the monitoring image I, and the image generator 12 can send a request to the camera for receiving the monitoring image I.

Please refer to FIG. 1 to FIG. 10. FIG. 3A and FIG. 3B are flow charts of the image analyzing method according to the embodiment of the present invention. FIG. 4 to FIG. 10 are diagrams of the monitoring image I in different phases according to the embodiment of the present invention. The image analyzing method illustrated in FIG. 3A and FIG. 3B can be suitable for the image analyzing device 10 shown in FIG. 1. The monitoring image I can be a binary image preferably. The monitoring image I is consisted of several pixel units; a pixel unit which is triggered can have an initial marking value equal to a numeral 1, and the pixel unit which is not triggered can have an initial marking value equal to a numeral 0. An actual application is not limited to the above-mentioned embodiment, and depends on design demand. First, as shown in FIG. 4, steps S300 and S302 are executed to draw a detective identifying area Ri inside the monitoring image I, and to position at least one initial triggering pixel unit Ci within the detective identifying area Ri. The detective identifying area Ri can be automatically marked according to a computation result, or can be marked by an operator manually. The detective identifying area Ri may present some specially concerned area within the monitoring image I, such as pedestrian crosswalk on the road.

It should be mentioned that the image analyzing device 10 of the present invention may not draw the detective identifying area; in this situation, the image analyzing method can position one or several initial triggering pixel units Ci within all range of the monitoring image I for follow analysis steps.

Figure 6:
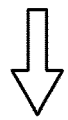

Then, as shown in FIG. 5, steps S304 and S306 are executed to assign a first detection region Rd1 with a center based on the initial triggering pixel unit Ci, and to position a first based pixel unit Cb1 conforming to a first target value T1 inside the first detection region Rd1. In the related steps, the monitoring image I only contains the triggering pixel unit (which has the initial marking value set as the numeral 1) and the non-triggered pixel unit (which has the initial marking value set as the numeral 0), so the first target value T1 can be set as the numeral 0 for distinguishing the triggering pixel unit from the non-triggered pixel unit. Illustration of conforming to the first target value T1 may represent an aim of searching a pixel unit which has a marking value greater than the first target value T1 and setting the said pixel unit as the first based pixel unit Cb1. The first detection region Rd1 can be a 1×1 matrix, so that the first based pixel unit Cb1 can be represented as the initial triggering pixel unit Ci. Then, as shown in FIG. 6, step S308 is executed to apply a mask M with a center based on the first based pixel unit Cb1, for determining whether at least one first triggering pixel unit Ct1 can be positioned inside the mask M.

If the first triggering pixel unit Ct1 cannot be positioned inside the mask M, step S310 is executed to determine the maximal dimension of the region of interest O only corresponds to the initial triggering pixel unit Ci. If the first triggering pixel unit Ct1 can be positioned inside the mask M, step S312 is executed to determine the maximal dimension of the region of interest O at least corresponds to the initial triggering pixel unit Ci and the first triggering pixel unit Ct1. The first triggering pixel unit Ct1 and the initial triggering pixel unit Ci both have the initial marking value (such as the numeral 1). For preventing the triggering pixel unit from being searched repeatedly, step S314 is executed to set the marking value of the Nth first triggering pixel unit Ct1 as an amount of the initial marking value and the numeral N when the first triggering pixel unit Ct1 is positioned. A symbol N is a positive number greater than or equal to the numeral 1. The operation processor 14 can scan all pixel units from up to down and from left to right, and therefore marking values of three first triggering pixel units Ct1 inside the mask M can be respectively set as numerals 2, 3 and 4, as shown in FIG. 6.

Figure 7:
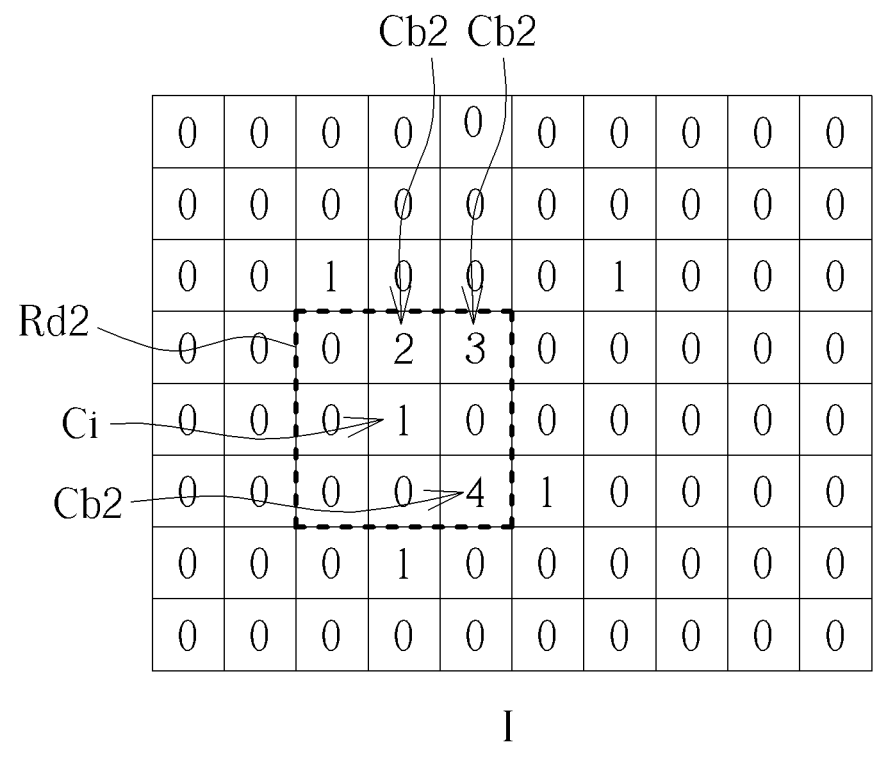

The image analyzing method can further determine whether the region of interest O has a larger dimension, and step S316 is executed to regulate the first target value T1 to be a second target value T2. The second target value T2 can be used to differentiate the initial triggering pixel unit Ci from the first triggering pixel unit Ct1, so that the second target value T2 can be set as the numeral 1. Then, as shown in FIG. 7, step S318 is executed to assign a second detection region Rd2 with a center based on the initial triggering pixel unit Ci. The second detection region Rd2 has a dimension larger than a dimension of the first detection region Rd1. Each side (such as an upper side, a lower side, a left side and a right side) of the first detection region Rd1 can be broadened by one or several pixel units to be a range of the second detection region Rd2; for example, the second detection region Rd2 may be a 3×3 matrix. Then, steps S320 and S322 are executed to position a second based pixel unit Cb2 conforming to the second target value T2 inside the second detection region Rd2, and to apply the mask M with a center based on one or several second based pixel units Cb2, for determining whether a second triggering pixel unit Ct2 can be positioned inside the mask M, as shown in FIG. 7 to FIG. 10.

Figure 8:
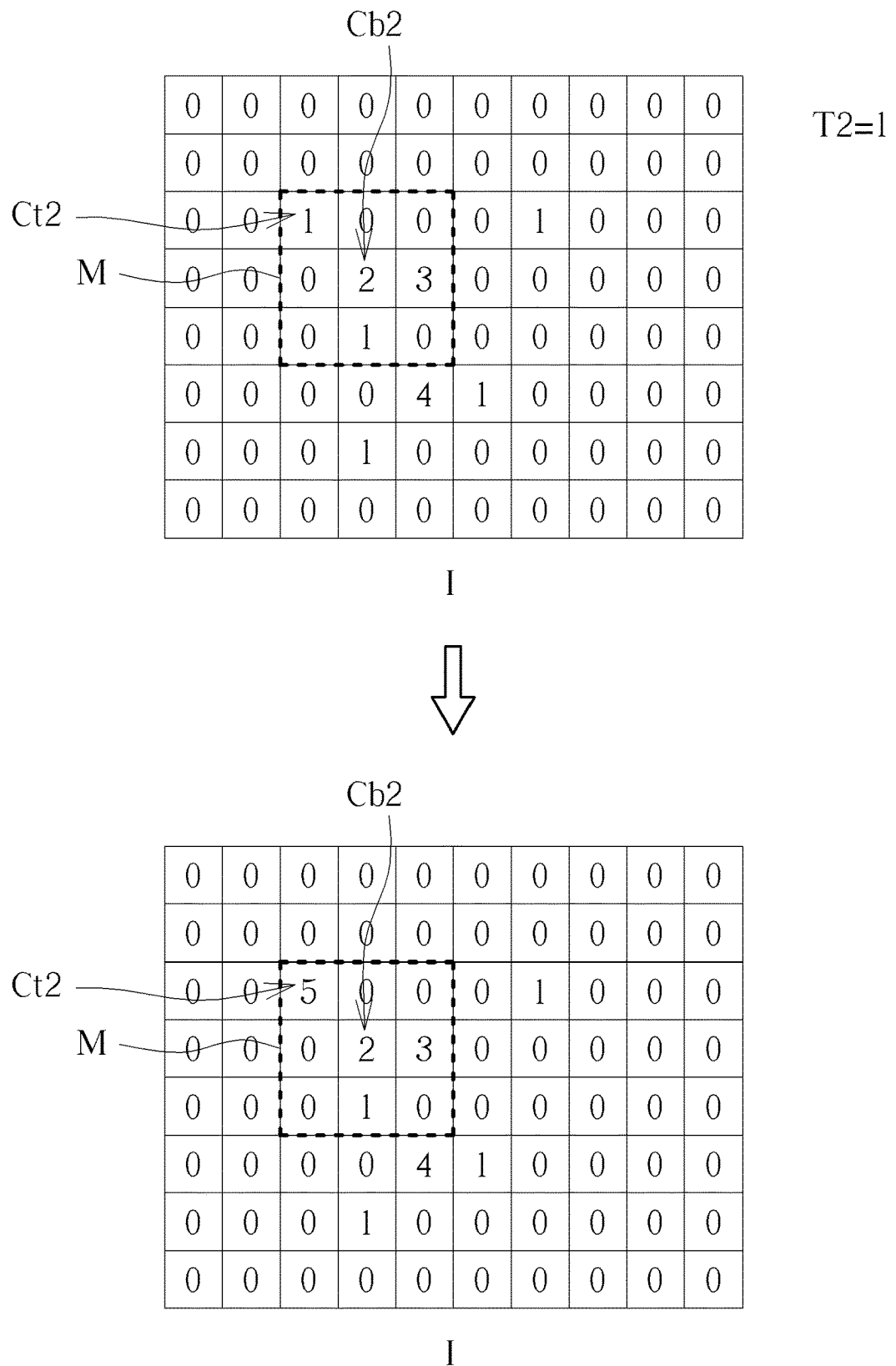
Figure 9:
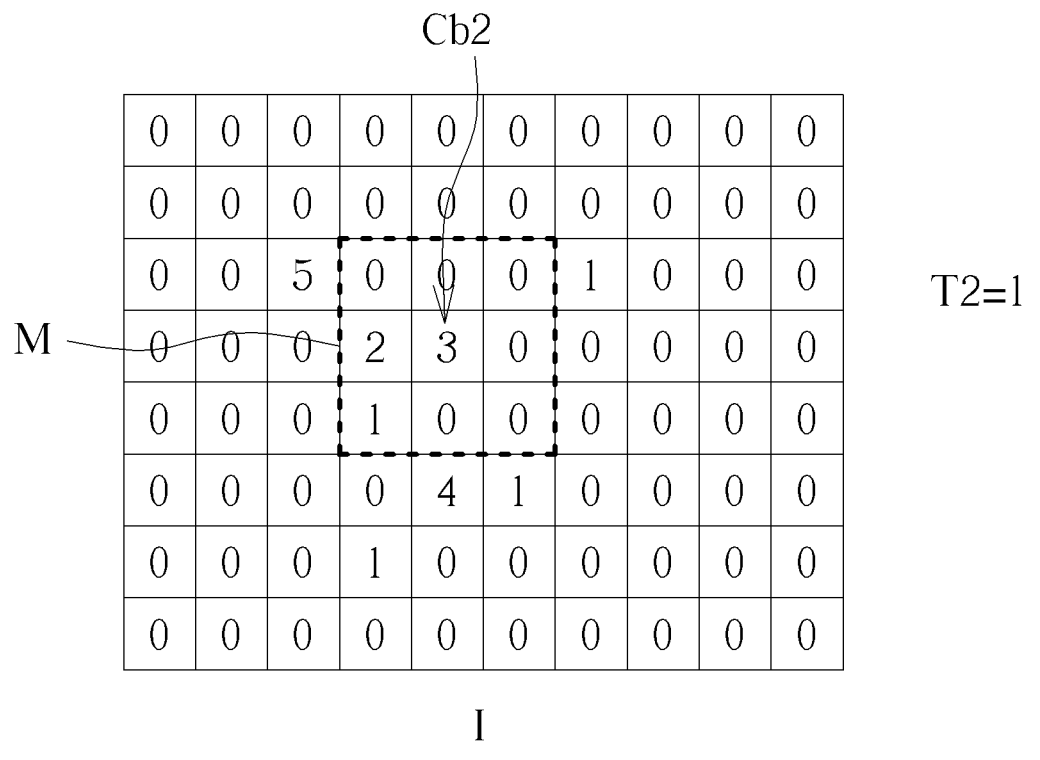
Figure 10:
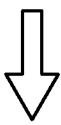

In step S320, illustration of conforming to the second target value T2 may represent an aim of searching a pixel unit which has a marking value greater than the second target value T2 and setting the said pixel unit as the second based pixel unit Cb2, such as the pixel units having the marking values 2, 3 and 4. In step S322, the maximal dimension of the region of interest O can be changed in accordance with a positioning result of the second triggering pixel unit Ct2. If the second triggering pixel unit Ct2 cannot be positioned inside the mask M, step S324 is executed to determine the maximal dimension of the region of interest O corresponds to the initial triggering pixel unit Ci and the first triggering pixel unit Ct1; for example, the mask M shown in FIG. 9 does not cover the second triggering pixel unit Ct2. If the second triggering pixel unit Ct2 can be positioned inside the mask M, as shown in FIG. 8 and FIG. 10, step S326 is executed to determine the maximal dimension of the region of interest O at least corresponds to the initial triggering pixel unit Ci, the first triggering pixel unit Ct1 and the second triggering pixel unit Ct2. Therefore, the image analyzing method of the present invention can gradually broaden the detecting range, and set the initial triggering pixel unit Ci as a center to progressively detect other triggering pixel units around and adjacent to the initial triggering pixel unit Ci, so as to determine an amount of the triggering pixel units covered by the region of interest O (which means the maximal dimension).

Then, step S328 is executed to regulate the marking value of a Mth second triggering pixel unit Ct2 as an amount of the initial marking value and numbers N and M when M number of the second triggering pixel units Ct2 are positioned. A symbol M can be a positive number greater than or equal to a numeral 1. After step S328, the image analyzing method can further regulate the target value for determining whether the region of interest O has the larger dimension, such as repeating execution of step S318 to step S326, for assigning a larger third detection region with a center based on the initial triggering pixel unit Ci, positioning a third based pixel unit conforming to a third target value within the third detection region, and applying the mask with a center based on the third based pixel unit for determining whether a next triggering pixel unit is positioned inside the mask. The repeated execution of step S318 to step S326 can be ceased when there is no triggering pixel unit positioned inside the mask. In the embodiment of the present invention, the target value in a following phase can be adjusted to the numeral 1 when the target value in a previous phase is equal to the numeral 0, such as the embodiment of regulating the first target value to the second target value. If the target value in the previous phase is not equal to the numeral 0, the target value in the following phase can be regulated to an amount of the initial marking value and a quantity of the previous-phase triggering pixel unit. For example, if wondering the region of interest O may have the larger dimension after step S328, the third target value in the following phase can be the amount of the initial marking value (which is equal to the numeral 1) and the quantity of the first triggering pixel unit Ct1 (the symbol N is equal to the numeral 3), which means the numeral 4.

After step S328, if the image analyzing method determines whether the region of interest O has the larger dimension, the third detection region with a center based on the initial triggering pixel unit Ci and greater than the second detection region Rd2 can be assigned. In the embodiment of the present invention, the upper side, the lower side, the left side and the right side of the previous-phase detection region can be broadened by K number of pixel units to generate the following-phase detection region, and a symbol K is a positive number greater than or equal to a numeral 1. Thus, the third detection region in the following phase can be a 5×5 matrix, and a fourth detection region in a phase next the following phase can be a 7×7 matrix.

The mask M provided in the embodiment of the present invention can be the 3×3 matrix, and an actual application is not limited to the above-mentioned embodiment. The dimension of the mask M is adjustable, so that the mask M can be a 5×5 matrix or a 7×7 matrix. The mask M can be utilized to search whether an un-positioned triggering pixel unit exists around the triggering pixel unit positioned in the previous phase. If the mask M belongs to a small dimension unit matrix, the triggering pixel units which abut against to each other can be positioned for accurately determining the maximal dimension of the region of interest O; if the mask M belongs to a large dimension unit matrix, the triggering pixel units which are spaced in a slight interval can be positioned, so as to increase triggering sensitivity of the monitoring camera apparatus. Dimensions of the mask M can be designed according to the actual demand.

The image analyzing method can utilize the mask M to position several triggering pixel units (such as the initial triggering pixel unit Ci, the first triggering pixel unit Ct1 and/or the second triggering pixel unit Ct2) adjacent to each other within the monitoring image I, and compute a total number of the triggering pixel units for acquiring the maximal dimension of the region of interest O inside the monitoring image I. The image analyzing method can determine whether the total number of the triggering pixel unit conforms to a predefined triggering condition, and accordingly determine whether to trigger the event for executing the specific function or actuating the application program or applying to the similar matrix computation and analysis. The triggering condition can be a ratio of the total number of the triggering pixel units to a pixel amount of the monitoring image I. For example, the triggering condition may be set as a ten percent in the foresaid ratio, so that the maximal dimension of the region of interest O which contains ten or more than ten triggering pixel units can belong to a target of the monitoring camera apparatus when the monitoring image I is consisted of a hundred pixel units.

The region of interest mentioned in the embodiment of the present invention can be a target object inside the monitoring image; in other possible embodiments, the region of interest can be an overexposure region inside the monitoring image, or other regions having specific image features inside the monitoring image, and the actual application is not limited to the foresaid embodiments. The image analyzing method can sieve and regulate any kinds of the image region in the present invention.

In an example of the region of interest being the overexposure region inside the monitoring image, the image analyzing method of the present invention can effectively distinguish a collective overexposure region from a distributed overexposure region inside the monitoring image. For instance, the image analyzing device can acquire the monitoring image about the road in the nighttime, and identify vehicle headlight for detection of the passing vehicle. The vehicle headlight provides high intensity, so that a specific region inside the monitoring image can be the overexposure region and also be the region of interest desired by the image analyzing method. However, street lamps may generate some overexposure regions on the monitoring image, but the street lamps are distributed over the road to merely generate some small scale overexposure regions. The small scale overexposure region about the street lamps is different from a large scale overexposure region about the vehicle headlight. Thus, the image analyzing method of the present invention can receive the monitoring image, and then position the initial triggering pixel unit inside the monitoring image or the related detective identifying area, so as to position the first triggering pixel unit and the second triggering pixel unit via the foresaid steps. The overexposure region formed by the street lamp has the small scale (which may correspond to the initial triggering pixel unit), and the overexposure region formed by the vehicle headlight has the large scale (which may correspond to the initial triggering pixel unit, the first triggering pixel unit and the second triggering pixel unit), so that available data, such as the maximal dimension of the region of interest, can be sieved out from the monitoring image.

In conclusion, the image analyzing method and the related image analyzing device of the present invention can accurately position the maximal dimension of the region of interest inside the detective identifying area, for advancing accuracy of the image identification. If the total number of the triggering pixel occupied by the moving region of interest inside the monitoring image conforms to the triggering condition, the image analyzing method of the present invention can analyze and acquire the maximal dimension of the region of interest, so as to further identify that the moving region of interest belongs to the single region of interest with the large scale, or the distributed regions of interest with the small scale, or the false-triggering region. If a part of the region of interest is inside the detective identifying area, such as a lower part of a passerby being inside the detective identifying area upon the pedestrian crosswalk, the image analyzing method of the present invention still can utilize the triggering pixel unit within the detective identifying area to position the maximal dimension of the region of interest probably outside the detective identifying area, and accurately determine whether to trigger the event or apply to the similar matrix computation. In addition, the image analyzing method of the present invention can adjust the target value and the marking value of the triggering pixel unit in every positioning phases, and thus the triggering pixel unit positioned in the previous phase cannot be re-positioned in the following phase, so as to effectively decrease computation data for improving computation efficiency of the image analyzing device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image analyzing method of detecting a dimension of a region of interest inside an image, the image being divided into several triggering pixel units relevant to the region of interest and several non-triggering pixel units irrelevant to the region of interest, the image analyzing method comprising:
   positioning an initial triggering pixel unit within a detective identifying area inside the image;
   drawing a first detection region inside the image, wherein the initial triggering pixel unit is a center of the first detection region;
   determining whether any pixel unit within the first detection region conforms to a first target value and then defining one pixel unit conforming to the first target value as a first based pixel unit;
   drawing a mask inside the image to cover the first based pixel unit and determining whether a first triggering pixel unit is positioned inside the mask, wherein the first based pixel unit is a center of the mask; and
   deciding whether a maximal dimension of the region of interest inside the image is equal to an individual size of the initial triggering pixel unit or a combined size of the initial triggering pixel unit and the first triggering pixel unit according to a foresaid positioning result of the first triggering pixel unit.

2. The image analyzing method of claim 1, wherein the maximal dimension of the region of interest corresponds to the initial triggering pixel unit when the first triggering pixel unit is not positioned inside the mask, and the maximal dimension of the region of interest corresponds to the initial triggering pixel unit and the first triggering pixel unit when the first triggering pixel unit is positioned inside the mask.

3. The image analyzing method of claim 1, wherein the initial triggering pixel unit and the first triggering pixel unit both have an initial marking value, the image analyzing method further comprises:
   setting a marking value of a Nth first triggering pixel unit as an amount of the initial marking value and a numeral N when N number of the first triggering pixel units are positioned;
   wherein a symbol N is a positive number greater than or equal to a numeral 1.

4. The image analyzing method of claim 3, further comprising:
   regulating the first target value to be a second target value;
   assigning a second detection region with a center based on the initial triggering pixel unit, and the second detection region being greater than the first detection region;
   positioning a second based pixel unit conforming to the second target value inside the second detection region;
   applying the mask with the center based on the second based pixel unit to determine whether a second triggering pixel unit is positioned inside the mask; and
   utilizing a positioning result of the second triggering pixel unit to decide the maximal dimension of the region of interest.

5. The image analyzing method of claim 4, wherein the maximal dimension of the region of interest corresponds to the initial triggering pixel unit and the first triggering pixel unit when the second triggering pixel unit is not positioned inside the mask, and the maximal dimension of the region of interest corresponds to the initial triggering pixel unit, the first triggering pixel unit and the second triggering pixel unit when the second triggering pixel unit is positioned inside the mask.

6. The image analyzing method of claim 4, wherein the second triggering pixel unit has the initial marking value, and the image analyzing method further comprises:
   setting a marking value of a Mth second triggering pixel unit as an amount of the initial marking value and numbers N and M when M number of the second triggering pixel units are positioned;
   wherein a symbol M is a positive number greater than or equal to a numeral 1.

7. The image analyzing method of claim 4, wherein an upper side, a lower side, a left side and a right side of the first detection region are broadened by K number of pixel units to generate the second detection region, and a symbol K is a positive number greater than or equal to a numeral 1.

8. The image analyzing method of claim 7, wherein the second target value is regulated to the numeral 1 when the first target value is equal to a numeral 0, and the second target value is regulated to an amount of the numeral 1 and N when the first target value is not equal to the numeral 0.

9. The image analyzing method of claim 1, further comprising:
   computing a total number of the initial triggering pixel unit and the first triggering pixel unit; and
   determining whether the total number conforms to a triggering condition in accordance with a computing result so as to actuate an application program.

10. The image analyzing method of claim 9, wherein the triggering condition is a predefined ratio of the total number to a pixel amount of the image.

11. The image analyzing method of claim 1, wherein the mask is a matrix with an adjustable dimension.

12. An image analyzing device of detecting a dimension of a region of interest inside an image and further applying for a monitoring camera apparatus, the image analyzing device comprising:
  an image generator adapted to receive the image, the image being divided into several triggering pixel units relevant to the region of interest and several non-triggering pixel units irrelevant to the region of interest; and
  an operation processor electrically connected to the image generator, the operation processor being adapted to position an initial triggering pixel unit within a detective identifying area inside the image, draw a first detection region inside the image, wherein the initial triggering pixel unit is a center of the first detection region, determine whether any pixel unit within the first detection region conforms to a first target value and then defining one pixel unit conforming to the first target value as a first based pixel unit, drawing a mask inside the image to cover the first based pixel unit and determining whether a first triggering pixel unit is positioned inside the mask, wherein the first based pixel unit is a center of the mask, and decide whether a maximal dimension of the region of interest inside the image is equal to an individual size of the initial triggering pixel unit or a combined size of the initial triggering pixel unit and the first triggering pixel unit according to a foresaid positioning result of the first triggering pixel unit.

13. The image analyzing device of claim 12, wherein the maximal dimension of the region of interest corresponds to the initial triggering pixel unit when the first triggering pixel unit is not positioned inside the mask, and the maximal dimension of the region of interest corresponds to the initial triggering pixel unit and the first triggering pixel unit when the first triggering pixel unit is positioned inside the mask.

14. The image analyzing device of claim 12, wherein the initial triggering pixel unit and the first triggering pixel unit both have an initial marking value, the operation processor is further adapted to set a marking value of a Nth first triggering pixel unit as an amount of the initial marking value and a numeral N when N number of the first triggering pixel units are positioned, and a symbol N is a positive number greater than or equal to a numeral 1.

15. The image analyzing device of claim 14, wherein the operation processor is further adapted to regulate the first target value to be a second target value, assign a second detection region with a center based on the initial triggering pixel unit, position a second based pixel unit conforming to the second target value inside the second detection region, apply the mask with the center based on the second based pixel unit to determine whether a second triggering pixel unit is positioned inside the mask, and utilize a positioning result of the second triggering pixel unit to decide the maximal dimension of the region of interest, wherein the second detection region is greater than the first detection region.

16. The image analyzing device of claim 15, wherein the maximal dimension of the region of interest corresponds to the initial triggering pixel unit and the first triggering pixel unit when the second triggering pixel unit is not positioned inside the mask, and the maximal dimension of the region of interest corresponds to the initial triggering pixel unit, the first triggering pixel unit and the second triggering pixel unit when the second triggering pixel unit is positioned inside the mask.

17. The image analyzing device of claim 15, wherein the second triggering pixel unit has the initial marking value, and the operation processor is further adapted to set a marking value of a Mth second triggering pixel unit as an amount of the initial marking value and numbers N and M when M number of the second triggering pixel units are positioned, and a symbol M is a positive number greater than or equal to a numeral 1.

18. The image analyzing device of claim 15, wherein an upper side, a lower side, a left side and a right side of the first detection region are broadened by K number of pixel units to generate the second detection region, a symbol K is a positive number greater than or equal to a numeral 1, the second target value is regulated to the numeral 1 when the first target value is equal to a numeral 0, and the second target value is regulated to an amount of the numeral 1 and N when the first target value is not equal to the numeral 0.

19. The image analyzing device of claim 12, wherein the operation processor is further adapted to compute a total number of the initial triggering pixel unit and the first triggering pixel unit, and determine whether the total number conforms to a triggering condition in accordance with a computing result so as to actuate an application program, wherein the triggering condition is a predefined ratio of the total number to a pixel amount of the image.

20. The image analyzing device of claim 12, wherein the mask is a matrix with an adjustable dimension.

21. The image analyzing method of claim 1, wherein the region of interest is protruded from the detective identifying area.

22. The image analyzing device of claim 12, wherein the region of interest is protruded from the detective identifying area.

* * * * *